INVENTOR
ALFRED C. CATLAND

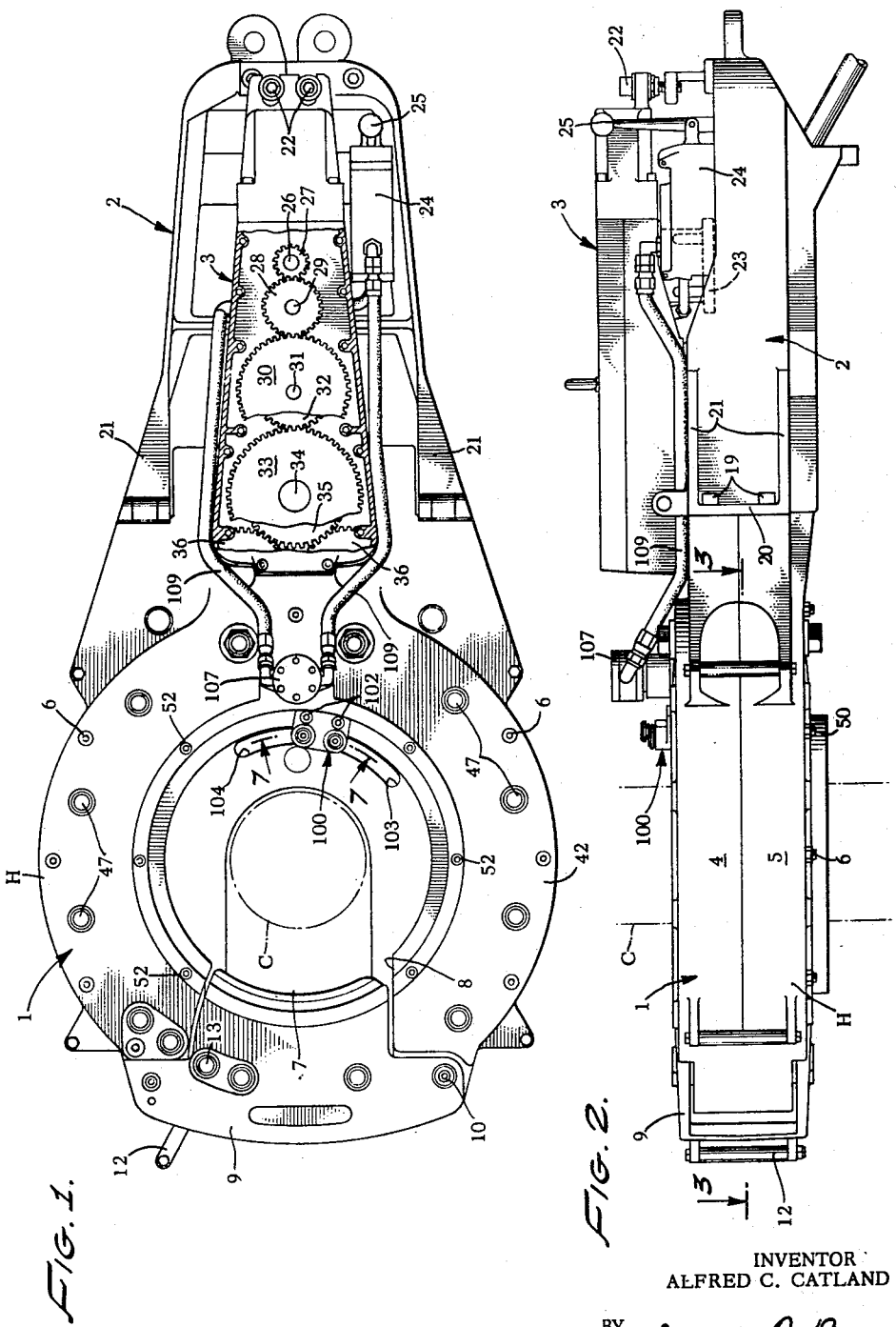
April 27, 1965     A. C. CATLAND     3,180,186
POWER PIPE TONG WITH LOST-MOTION JAW ADJUSTMENT MEANS
Filed Aug. 1, 1961     7 Sheets-Sheet 1
INVENTOR
ALFRED C. CATLAND
BY
ATTORNEY

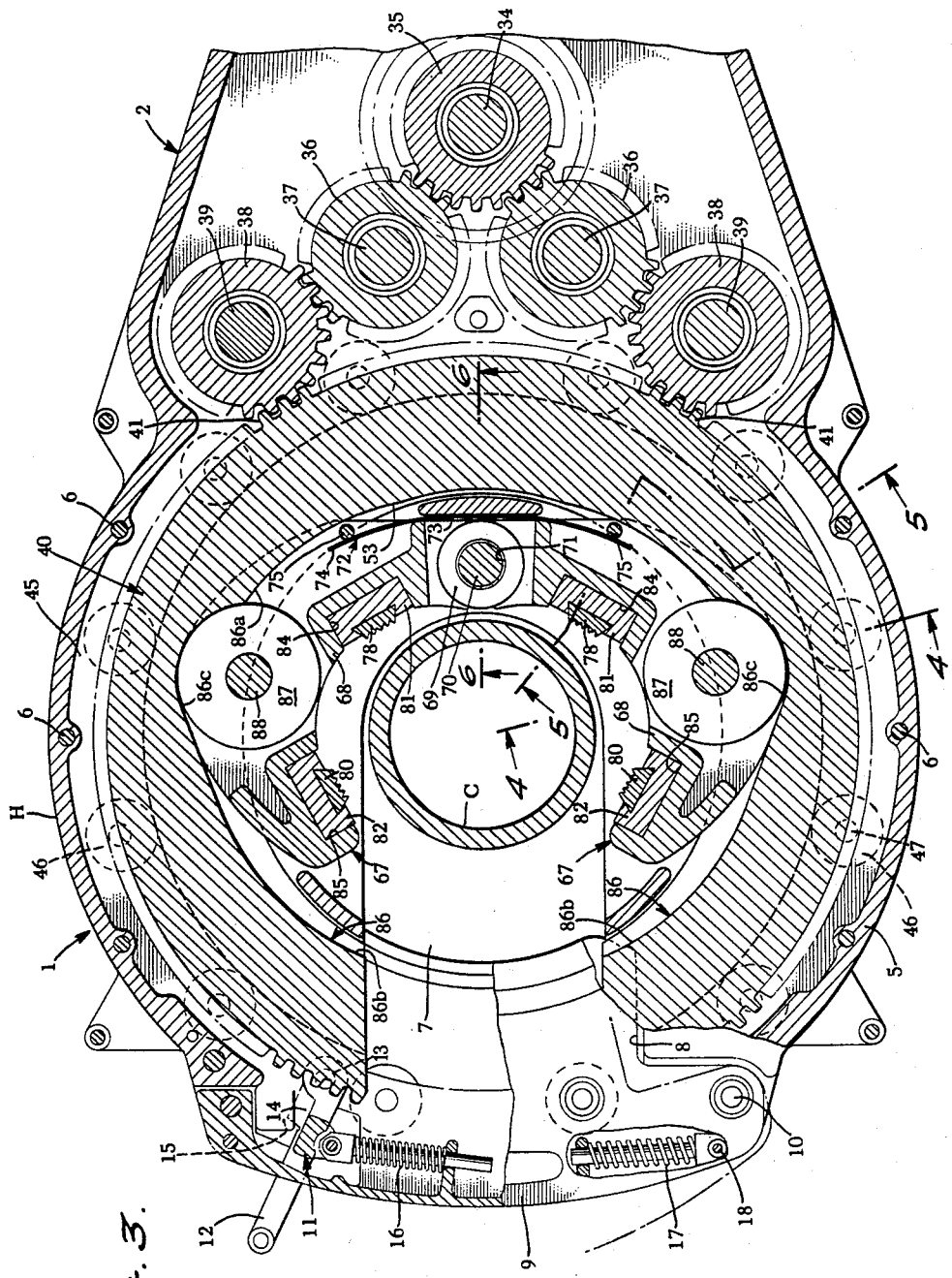

April 27, 1965 A. C. CATLAND 3,180,186
POWER PIPE TONG WITH LOST-MOTION JAW ADJUSTMENT MEANS
Filed Aug. 1, 1961 7 Sheets-Sheet 4

INVENTOR
ALFRED C. CATLAND

BY *Joseph R. Dwyer*
ATTORNEY

INVENTOR
ALFRED C. CATLAND
BY
ATTORNEY

INVENTOR
ALFRED C. CATLAND
BY *Joseph R. Dwyer*
ATTORNEY

United States Patent Office 3,180,186
Patented Apr. 27, 1965

3,180,186
POWER PIPE TONG WITH LOST-MOTION
JAW ADJUSTMENT MEANS
Alfred C. Catland, Alhambra, Calif., assignor, by mesne assignments, to Byron Jackson Inc., Long Beach, Calif., a corporation of Delaware
Filed Aug. 1, 1961, Ser. No. 128,547
5 Claims. (Cl. 81—57)

The present invention relates to power tongs of the type employed in making up and breaking out pipe joints in strings of well pipe, such as well casing, drill pipe and tubing.

It is the practice in the drilling, completion and production of oil wells to employ tonging devices engageable with the well pipe to impart rotation to a stand of such pipe which is supported in the surface rigging above the well so as to make a threaded connection of such stand of pipe with the pipe string extending into the well, or to remove such stand of pipe from the string of pipe leading into the well as the case may be. Power-operated devices have been developed, which substantially expedite the procedure of rotating the stand of pipe supported in the well rigging, thus effecting a substantial savings in time in running into the well a string of pipe, or in removing such string of pipe from the well.

A principal object of the present invention is to provide a power tonging device having a gripping mechanism automatically engageable with the pipe so as to effect rotation thereof, and having means incorporated therein to effect adjustment or alignment of the gripping mechanism upon initial engagement with the pipe so as to effect efficient rotation thereof.

Another object of the invention is to provide a tonging head which is automatically operable to engage the pipe to effect rotation thereof in either direction upon reversal of the drive to the tonging head.

In the prior art power operated devices the problem of aligning or adjusting the gripping mechanism was quite difficult where four dies were used as distinguished from gripping mechanisms having only three dies. As was often the case where four dies were used, one of the dies did not contact the pipe at all, or if it did contact the pipe it did so in such a manner that no force was imposed by the die on the pipe. Accordingly, another specific object of this invention is to provide a tonging head having means to effect adjustment or alignment of the gripping mechanism so that each of the dies impose a force on the pipe for the driving of the pipe to effect rotation thereof.

In accordance with the above objectives, the tonging head is provided with a radial throat for the reception of the pipe to be rotated, and within the throat there is revolvably disposed a gripping mechanism comprising an outer driving ring for driving an inner partial ring, and including a number of circumferentially spaced die means which are adapted to be automatically moved into engagement with the pipe, or retracted from engagement with the pipe responsive to relative rotation between the inner and outer rings. These die means are mounted on jaw means which are pivotally but loosely connected to each other to permit adjustment of the die means on initial contact with the pipe so that each die will impose a force on the pipe, thus to minimize distortion or crimping of the pipe. With the tonging head constructed in accordance with the teachings of this invention, therefore, not only does each die impose a force on the pipe, but it is apparent that diametrically opposed dies impose equal forces on the pipe.

Other objectives and advantages of the invention will hereinafter be described or will become apparent to those skilled in the art, and the novel features of the invention will be defined in the appended claims.

Referring to the drawings:

FIG. 1 is a top plan view of one embodiment of a power tong made in accordance with the invention, with a portion of the gear case removed to expose the power train to the tonging head;

FIG. 2 is a side elevational view of the tong of FIG. 1;

FIG. 3 is an enlarged fragmentary sectional view taken on the line 3—3 of FIG. 2 and showing the dies ready to grip a relatively large pipe;

Figure 4:
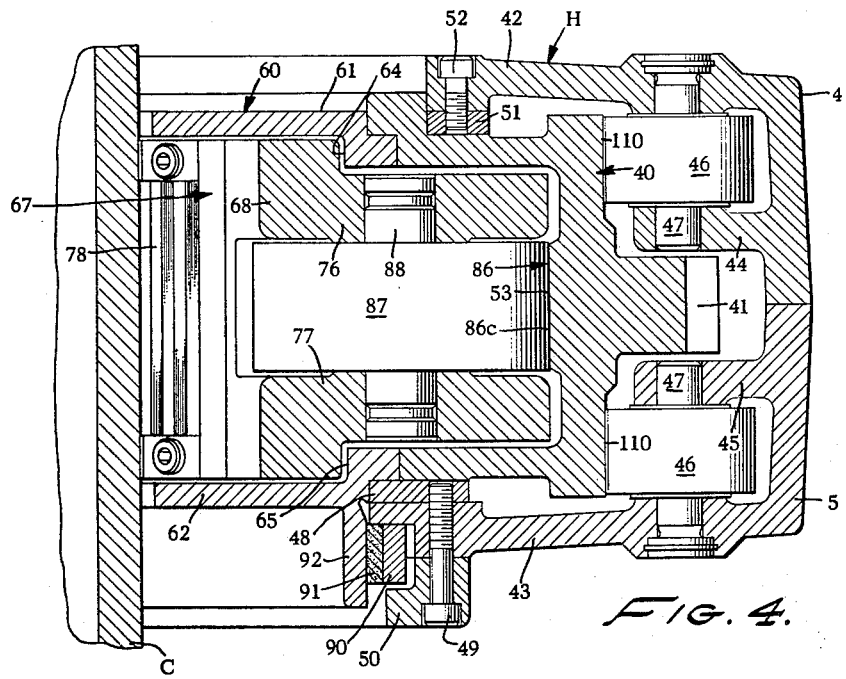
FIG. 4 is an enlarged fragmentary view in section taken on the line 4—4 of FIG. 3.

Referring now particularly to FIGS. 1 and 2, the tong of the present invention comprises three major components, namely, a tonging head generally designated 1 which is supported upon a lever generally designated 2, the lever 2 having disposed thereon a gear box generally designated 3.

The tonging head 1 comprises a frame or housing H composed of complemental housing sections 4 and 5, secured together along the mid-plane of the head as by a suitable number of through fasteners 6. The tonging head 1 has a pipe opening 7, and is also provided with a radial throat 8 leading into the pipe opening 7 along the longitudinal center of the tong.

Supported by the frame or housing H is a gate 9 pivotally connected, as at 10 to the frame or housing H at one side of the throat 8, and adapted to bridge the throat and to be releasably latched at its free end to the frame or housing H at the opposite side of the throat 8.

Referring to FIG. 3, latch means generally designated 11 are carried by the gate 9. This latch means includes an arm 12 pivotally carried by the gate as at 13 internally thereof and projecting through the gate 9 to enable manual operation of the latch arm 12. Carried by the arm 12 is a latching lug 14, engageable in a recess 15 in frame or housing H adjacent the mouth of the throat 8, and spring means 16 are employed to normally bias the arm 12 in a position to effect engagement of the lug 14 in the recess 15.

In addition, spring means 17 are pivotally supported as at 18 to the frame or housing H at the opposite side of the throat 8 from the recess 15, and in spaced relation to the pivotal mounting 10 of the gate 9 to the housing H. This spring means is adapted to bias the gate 9 to a closed position and to bias the gate 9 to an open position respectively, as the line of force of the spring means passes over a center line leading through the pivot support 10 of the gate 9 and the pivot support 18 of the spring means 17.

The gate construction forms no part of the present invention and therefore need not be described in further detail.

Also, as shown in FIG. 2, at its inner end, the housing or frame H is secured to the lever 2 as by means of a suitable number of screw fasteners 19 extending through vertical webs 20 of the lever 2 which are carried by transversely spaced side walls 21 of the lever.

The gear box 3, previously referred to, is appropriately mounted at one end to the frame or housing H, and is anchored, at its other end, to the free end of the lever 2 as by anchor bolts 22. Disposed beneath the gear box adjacent the free end of the lever, as shown in FIG. 2, is an appropriate motor device, such as a hydraulic motor 23, which is controlled by an appropriate valve mechanism 24 disposed to one side of the gear box 3, and including an operating lever 25, so as to drive the motor output shaft in either direction.

It will be noted that the output shaft of the motor 23 is designated 26 in FIG. 1, and has a drive gear 27 mounted thereon, meshing with an idler gear 28 which is mounted on a shaft 29 journalled in the gear box 3. The idler gear 28 is, in turn, engaged with a large gear 30 mounted on a shaft 31 which is also journalled in the gear box 3, and which has a gear 32 mounted thereon and disposed beneath the large gear 30. Gear 32 is in mesh with a gear 33 which drives shaft 34 on which it is mounted, the shaft 34 also having thereon beneath the gear 33, a gear 35. Gear 35, as shown in FIG. 1, as well as in FIG. 3, is in mesh with a pair of idler gears 36, 36 disposed at opposite sides of the longitudinal center of the tong and mounted on shafts 37, 37 which are preferably journalled in the upper and lower sections 4 and 5 of the housing or frame H. Gears 36 in turn are meshed with a pair of drive gears 38, 38 mounted on shafts 39, these shafts also preferably being journalled in the housing or frame sections 4 and 5.

The gears 38 being driven by the gear train comprising gears 27, 28, 30, 32, 33, 35 and 36, constitute means for imparting rotation to an outer partial, drive ring generally designated 40, having on its outer periphery a bull gear 41. The outer ring 40 has a side or radial opening therein adapted, in a manner which will hereinafter be more particularly described, to be aligned with the throat 8 through the frame or housing H for the reception of a pipe section.

Figure 5:
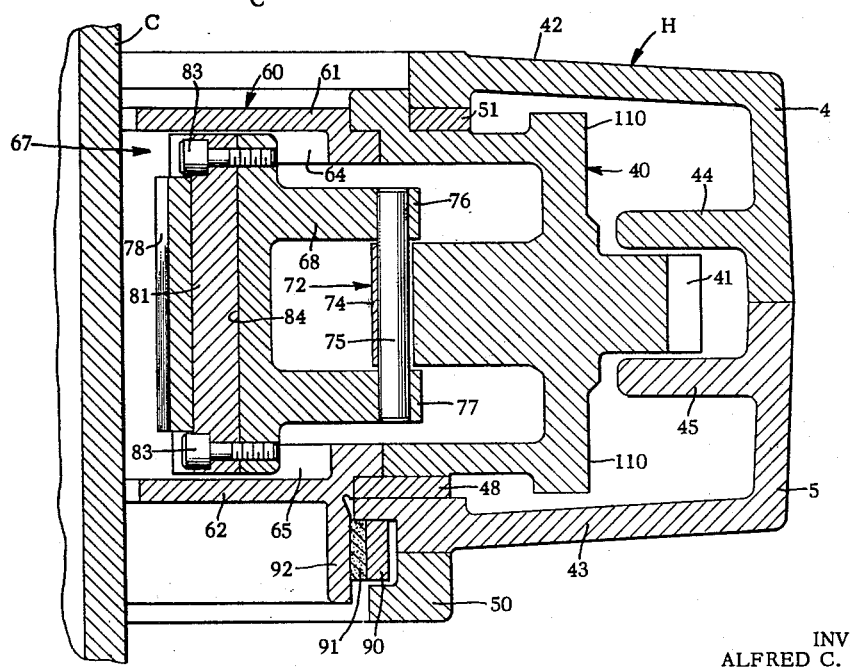
FIG. 5 is an enlarged fragmentary view in section taken on the line 5—5 of FIG. 3.

As is best seen in FIGS. 4 and 5, the housing or frame H is generally of channel cross-section, and is formed with opposing arcuate upper and lower walls, 42 and 43 respectively. Internally thereof the frame or housing H is provided with a pair of circumferentially extended flanges 44 and 45 in the housing sections 4 and 5, respectively, and disposed in opposed spaced relation to the upper and lower walls 42 and 43. At a plurality of circumferentially spaced points, rollers 46 mounted on shafts 47 are mounted within the housing or frame H, with the shafts 47 supported in the opposing upper and lower walls 42 and 43 of the housing and the circumferentially extended flanges 44 and 45 (see FIG. 4). Accordingly, it will be noted that the rollers 46 constitute means for containing the outer partial ring 40 for rotation about its axis.

The outer partial ring 40 is vertically supported upon a wear ring or partly circular bearing ring 48, which is secured to the lower wall 43 of the housing H, as by means of a suitable plurality of circumferentially spaced fasteners 49. Also mounted on the outer surface of the lower wall 43 of the housing H is an L-shaped partly circular ring 50, constituting a shield for brake means which will hereinafter be more particularly described. In addition, there is a wear ring or partly circular bearing ring 51 carried at the inner periphery of the upper wall 42 of the housing and engaged with the outer partial ring 40, so as to constrain the partial ring 40 against substantial axial play within the housing or frame H. This bearing ring 51 is secured to the top wall 42 of housing H as by means of a suitable number of fasteners 52 disposed in circumferentially spaced relation.

Figure 8:
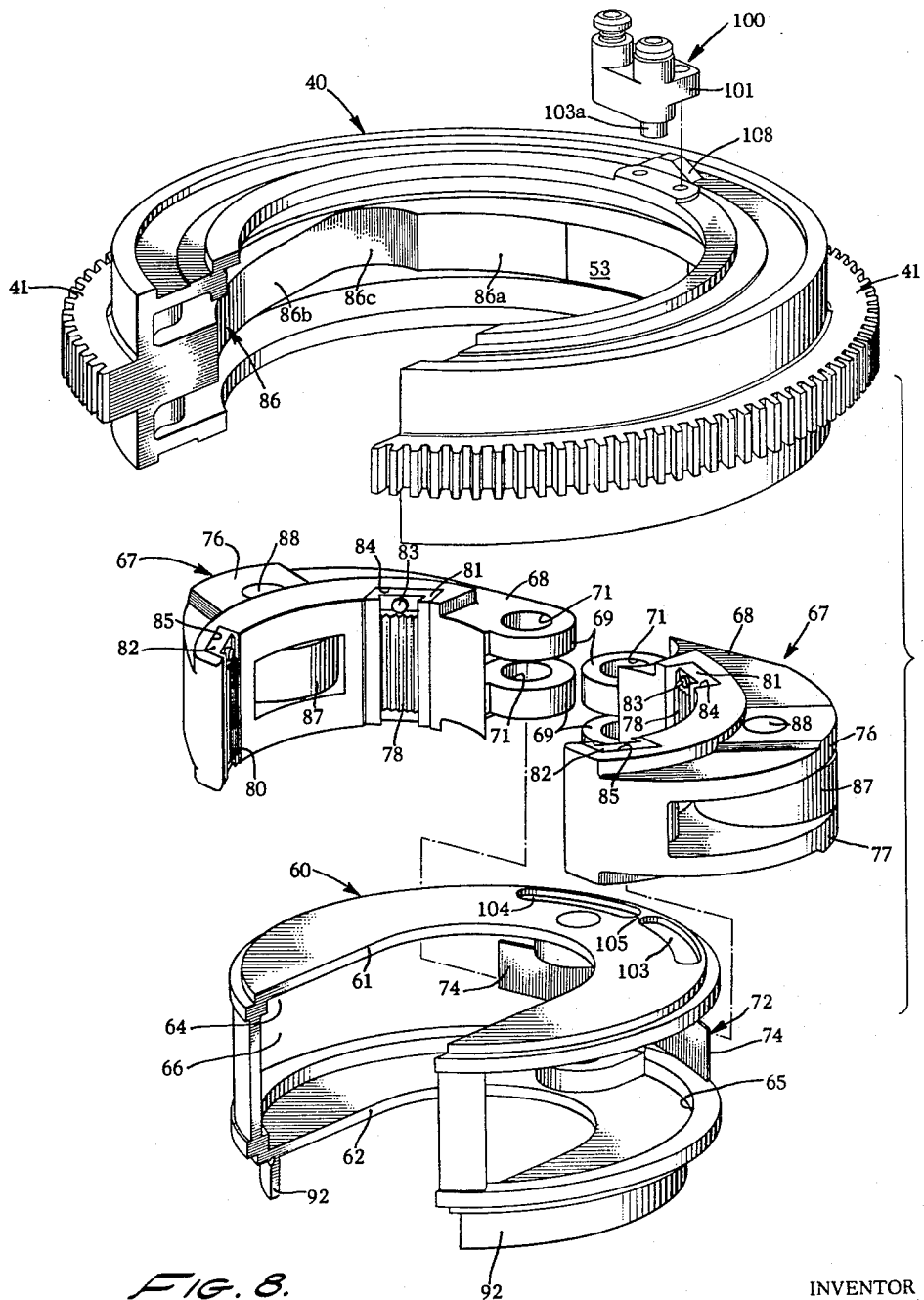
FIG. 8 is an exploded detail view, more particularly illustrating the partial pipe gripping and partial drive rings of the tonging head of the present invention.

The outer partial ring 40 is preferably a casting which as shown in FIGS. 4, 5 and 8, is of channel section adjacent the extremities thereof, there being an arcuate wall designated 53 at the inner periphery of the outer ring 40 and at the rear of the ring in opposed relation to the lateral pipe-receiving opening in the ring, so as to provide a rigid cross-sectional box configuration.

Disposed within the outer partial ring 40 is an inner partial ring generally designated 60, which also is preferably a casting having a lateral pipe opening adapted, in a manner which will hereinafter more particularly appear, to be aligned with the pipe opening in the outer ring 40.

Figure 6:
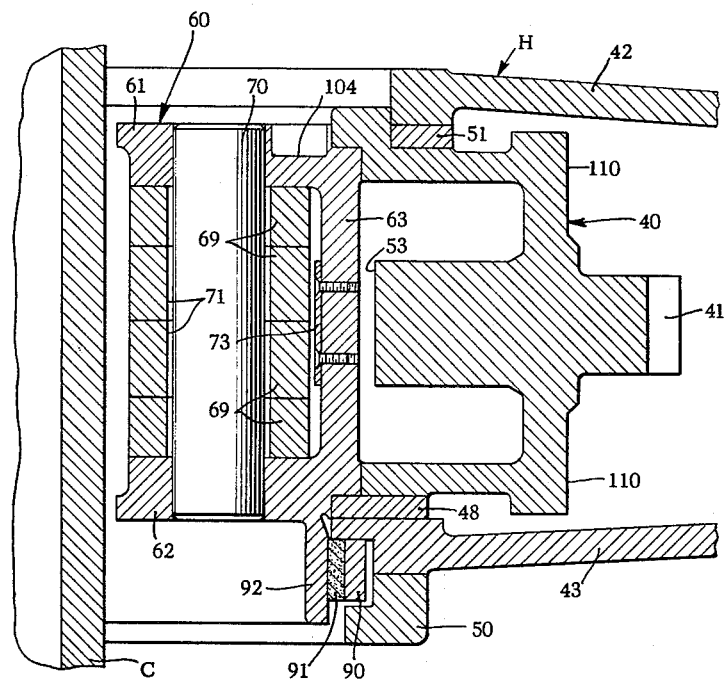
FIG. 6 is an enlarged fragmentary view in section taken on the line 6—6 of FIG. 3.

The inner ring 60 as herein shown, comprises an upper wall 61 and a lower wall 62, having at its base a vertical wall 63 (FIG. 6). Accordingly, at its base, the inner ring 60 is narrow in cross-section with the upper and lower walls being relatively narrow in depth but becoming wider in the middle and tapering to a point adjacent the outer extremity defining the previously referred to pipe opening as more clearly shown in FIG. 8. The vertical wall 63 has a pair of radial spaces 64 and 65. Between the extremities of the ring 60 there are radial spaces 65, 66 for the reception of a pair of jaws generally designated 67.

The jaws 67 each respectively comprise a body 68 having at one end a pair of mating mounting lugs 69 through which extends a pin 70 about which the jaws 67 are adapted to pivot for swinging movements towards and away from a section of pipe disposed within the pipe opening in the inner ring 60. The pin 70 is press-fitted (see FIG. 6) in the upper wall 61 and lower wall 62 of the inner ring 60 and extends through the mounting lugs 69. The aperture 71 of the lugs 69 are oversize or larger than the diameter of the pin 70 to thus define a lost motion connection between the jaws, which is important to the operation of this invention, as will become clear hereafter.

In order to bias the jaws outwardly with respect to the pipe opening in the inner ring, a leaf spring 72 preferably has its central portion 73 disposed on the vertical wall 63 and each end 74 engaged as best seen in FIGS. 3 and 5 behind a pin 75. Pin 75 is press-fitted as best seen in FIG. 5 into upper and lower radially outwardly extending ears 76 and 77, spaced apart to accommodate the spring. The spring is so disposed that inward movement of the jaws 67 about the pivot pin 69 will store energy in the spring to bias the jaws 67 outwardly.

Each of the jaws 67 is preferably provided with removable pipe gripping die segments 78 and 80 in undercut or dove-tailed vertically disposed blocks 81 and 82, which in turn are retained by head of screw 83 (FIG. 8) in vertically extending slots 84 and 85, which are rectangular in cross-section and formed in jaws 67. The disposition of the die segments in blocks as distinguished from positioning them directly in the jaws themselves gives greater flexibility to accommodate various sizes of pipe depending merely on the thickness of the blocks used as will be more clearly seen in connection with FIGURES 9–11 later to be described.

In order to effect movement of the jaws 65 about the pivot pin 69, the jaws 67 and the outer ring 40 have cooperative cam means to force the jaws inwardly responsive to relative angular displacement of the outer ring 40 with respect to the inner ring 60. In the illustrated embodiment, such cam means comprises a pair of cams 86, 86 formed on the outer ring.

As best seen in FIG. 3 the pair of cams 86 provide a pair of opposed ramps or cam surface means 86a, 86a, and a pair of opposed ramps 86b, 86b engageable with rollers 87, each rotatably supported by a shaft 88 journalled in opposed ears 76, 77, previously referred to, projecting outwardly from the respective jaws 67. Accordingly, upon relative angular movement between the outer ring 40 and the inner ring 60 in one direction, the opposed ramps 86a, 86a will engage the rollers 87 of the jaws 67 to cam the jaws inwardly about the pivot pin 69. On the other hand, relative angular displacement between the outer ring 40 and the inner ring 60 in the other direction will bring the opposed ramps 86b, 86b into engagement with the rollers 87 to effect inward pivotal movement of the jaws 67 about the pin 69.

Intermediate the ramps 86a and 86b of the respective compound cams 86, is an arcuate neutral section 86c constituting the low point of the compound cams, whereby the jaws will be caused by spring 73 to swing outwardly away from a section of pipe disposed in the pipe openings as the rollers 87 ride down either ramps or cam surfaces 86a or ramps or cam surfaces 86b onto neutral section 86c.

From the foregoing, it will be apparent that the inner ring assembly constitutes a pipe gripping mechanism operable responsive to rotation of the outer ring 40 relative to the inner ring 60. In order to effect such relative rotation, brake means as previously generally referred to are employed to frictionally resist rotation of the inner ring 60 relative to the housing or frame H. Such brake means in the illustrative embodiment, as best seen in FIGS. 4, 5 and 6, comprises a brake band 90, having a friction lining material 91 thereon engageable with a depending flange 92 on the lower wall 62 of the inner ring 60. The brake band 90 is connected to the housing or frame H in any suitable manner, as by pins or the like, as more particularly shown and described in U.S. Patent No. 2,650,070 issued August 25, 1953 to C. A. Lundeen.

While it will be apparent that if desired the inner ring 60 and the outer ring 40 may be positioned relative to the throat 8 through housing or frame H, so as to permit the application of the tong to, and the removal of the tong from a pipe joint, by means of manipulation of the control valve 24 which controls the drive to the outer ring through the gears previously described, it is preferred that means be provided for relatively positioning the inner ring and the outer ring, and that means also be provided for relatively positioning the outer ring and the housing or frame.

Figure 7:
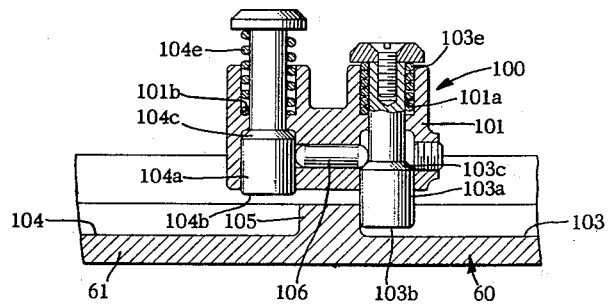
FIG. 7 is a fragmentary view in section taken on the line 7—7 of FIG. 1.

Accordingly, an inner ring positioning device generally designated 100 and best illustrated in FIGS. 1, 7 and 8 is employed to alternatively limit relative rotation between the inner and outer rings 60 and 40 respectively in one direction, so that the radial pipe openings therein are in radial alignment.

The positioning device 100 includes a body 101 mounted on the upper surface of the outer ring 40, as by a suitable number of fasteners 102 (FIG. 1), and overlying the inner ring 60. In the upper wall 61 of the inner ring is a pair of circumferentially spaced and arcuate slots 103 and 104, there being an abutment section 105 between the slots 103 and 104. Shiftably disposed in the body 101 is a pair of pins 103a and 104a, having inner ends 103b and 104b which are alternatively engageable in the circumferentially extended slots 103 and 104. Each of these inner ends 103b and 104b is provided with a bevelled surface 103c and 104c, respectively, alternately engageable with a detent 106 which is shiftably disposed in the body 101 for movement into engagement with the respective bevelled surfaces 103c and 104c upon depression of the pins 103a and 104a.

Each of the pins is provided with a head 103d and 104d, with which is engaged a compression spring 103e and 104e; these springs are seated in bores 101a and 101b in the body 101 so as to normally bias the respective pins outwardly with respect to the slots 103 and 104. However, it will be observed that when one pin is manually depressed, the spring acting on the other pin will shift the latter outwardly, thus camming the detent 106 into engagement with the bevelled surface of the other pin, so that depression of one pin automatically effects release and retraction of the other pin from slot 103 or 104, as the case may be, by means of the spring engageable with the respective pin head, and retention of the pin which is manually depressed in the respective slots 103 or 104, as the case may be, will also be effected. However, it will be noted that with either of the pins 103a and 104a disposed in the slots 103 or 104 and engaged with the abutment 105, the outer ring 40 and the inner ring 60 will be relatively angularly positioned such that the lateral pipe openings therethrough are in alignment.

In order to position the outer ring 40 relative to the housing or frame H, positioner valve means 107 (see FIG. 1) are employed, such valve means being more particularly shown and described in U.S. Patent No. 2,780,950, dated February 12, 1957, to J. H. Province. The positioner valve means 107, as will be apparent upon reference to the just-mentioned Patent No. 2,780,950, is adapted to cooperate with a positioner cam 108 which, as best seen in FIG. 8, is disposed on the upper surface of the outer ring 40 so as to actuate the valve 107. Connecting the positioner valve 107 to the control valve mechanism previously described are hydraulic lines 109, 109 as best seen in FIGS. 1 and 2.

It will be apparent that the function of the positioner valve means 107 is to shut off the flow of power fluid to the motor 23 when the control valve 24 is conditioned to render the positioner valve 107 operative, whereby the outer ring 40 will cease rotation when the pipe opening therethrough is aligned with the throat of the housing or frame H.

The operation of the present tong as specifically described in the foregoing is as follows, assuming the tong to be operating in a manner such as to effect clockwise rotation of the outer ring 40 and consequently the pipe gripping means as shown in FIGS. 1 and 3.

It should be noted that the dies 78 and 80 carried by the jaws 67 are spaced about the pipe opening so that the respective dies will have contact with the pipe at circumferentially spaced points about the latter. It will also be recognized that in order to provide proper engagement of the dies with the pipe C so that each die will contact and exert force on the pipe, a slight adjustment must be made where the pipe is not precisely centrally of the four dies. This is accomplished, as aforesaid, by a lost motion available to the jaws by the loose connection at their pivotal points about the pin 69, which lost motion is caused to function at the time of initial engagement of some of the dies with the pipe.

Stated otherwise, the present invention is said to provide adjustable die means, namely 78 and 80 carried by the jaws 67, which in turn are carried by the outer partial ring (inasmuch as the inner ring 60 is mounted for rotation in and is carried by the outer ring) disposed in sectors about a well pipe gripping mechanism and symmetry is preferably maintained in order to equally distribute the pipe engaging forces about the pipe. If the pipe, upon initial engagement by the dies, is not disposed precisely centrally, or if the dies are not in exact symmetry with the center of the opening so that all dies do not grip simultaneously, the reaction of the initial contact with the pipe causes movement and adjustment about the pin 69 with relative movement therebetween to finally adjust to a position where each die will apply a force to the pipe.

As the jaws 67 swing into engagement with the well pipe C so that the latter is gripped by the dies 78 and 80, the inner ring 60 will be locked up with the outer ring 40 so that rotation of the outer ring 40, the inner ring 60 and the pipe C as a unit will result. When it is desired to release the pipe C from the gripping mechanism, control valve 24 will be actuated to reverse the direction of rotation of the outer ring 40 whereupon the rollers 87 will ride down the opposite ramps 86b to the circumferentially extended low section 86c of the respective cams 86. At this time, stop pin end 103b just disposed in slot 103, as shown in FIG. 7, will abut the stop projection 105 to prevent further clockwise rotation of the outer ring 40 relative to the inner ring 60 so that these rings will accordingly rotate in a clockwise direction in unison.

Such unitary counter clockwise rotation will continue until such time as the positioning cam 108 cooperates with positioning valve means 107 previously referred to, to halt rotation of the outer ring 40, at which time the radial pipe openings in the outer ring 40 and the inner ring 60 will be aligned with the throat 8 through the housing or frame H. Thus, removal of the tong from the well pipe or casing C is permitted upon opening of the gate 9, and in addition the tong gripping mechanism is in position for reapplication of the tong mechanism to another pipe joint to be made up.

In the case where pipe joints are to be broken out by means of the present tong, it will now be recognized that it is only necesary to depress positioning pin 104a so that end 104b projects into slot 104 in inner ring 60, and pin 103a is retracted, whereupon relative rotation between the outer ring 40 and the inner ring 60 will be permitted only in a direction in which the outer ring rotates in a counter clockwise direction as viewed in FIGS. 1 and 3, so as to effect engagement of opposing cam surfaces 86a, 86a with rollers 87.

It will be appreciated that in the embodiment of the pipe gripping mechanism hereinabove specifically described, the provision of the camming surfaces 86a, 86b, 86c, on the outer partial ring 40, as best seen in FIG. 3 for engagement with a cam follower roller 87 carried by the respective jaws 67, on the one hand, or whether the one provided on the jaws with the rollers on the outer ring to be engaged thereby is principally a matter of choice. In either case the camming effect is caused by the angular movement of the outer ring 40 relative to the die carrying inner ring 60, whichever is considered the cam or the follower. That is, if the roller were on the ring and the surfaces 86a, 86b, and 86c were on the jaw 67, the surfaces would be the follower inasmuch as they are the moved parts.

Moreover, geometrically speaking, it will be noted upon reference to FIG. 3 particularly, that the die inserts are provided with a series of vertically extended teeth, each of which constitutes die means and which are disposed in the adjacent quadrants of a circle formed on the opposite sides of the center line of the pipe opening 8 through which the casing passes into the gripping mechanism. In addition, when the jaws 67 are actuated inwardly, the dies 80, 80 engage the casing C in the two quadrants of a circle in opposed relation to the dies 78, 78 in the other two quardants of a circle located on the opposite side of a line perpendicular to the center line of said opening 8, intersecting with said center line at the axis of the gripping mechanism.

Figure 9:
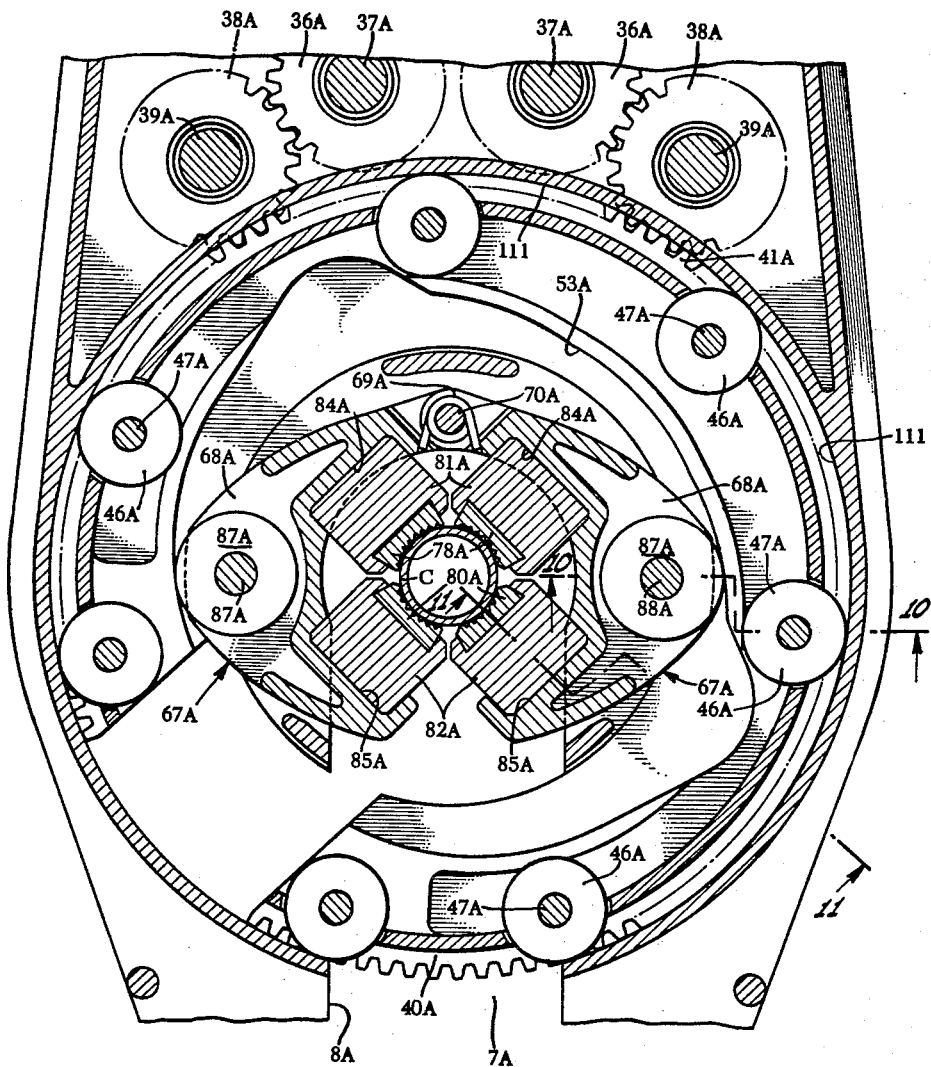
FIG. 9 is an enlarged fragmentary view of another embodiment of a power tong made in accordance with the invention, with a portion of the gear case removed to expose a portion of the power train to the tonging head and showing the dies gripping a small pipe and also showing another manner of mounting the outer ring in the power tong.
Figure 10:
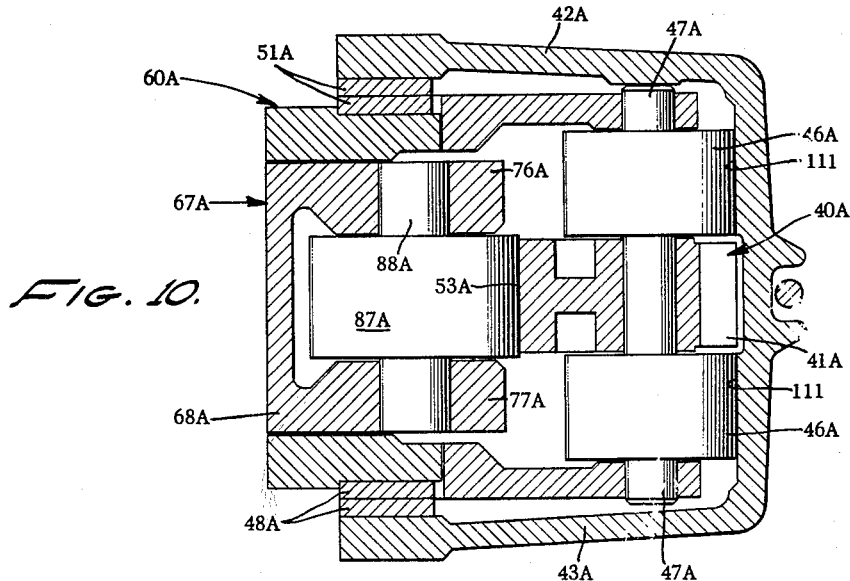
FIG. 10 is an enlarged fragmentary view in section taken on the line 10—10 of FIG. 9.
Figure 11:
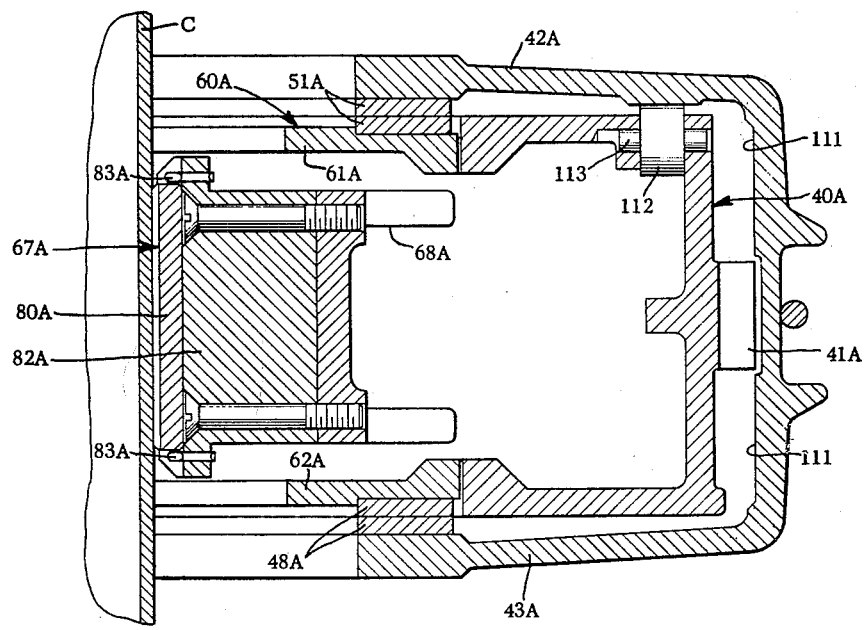
FIG. 11 is an enlarged fragmentary view in section taken on the line 11—11 of FIG. 9.

Referring now to the embodiment disclosed in FIGURES 9 through 11, it can be seen that the tonging head is gripping a pipe smaller than that described in connection with the FIGURES 1-8.

To accommodate the smaller pipe, the undercut or dovetail vertically disposed blocks 81A and 82A are disposed in the jaws 67A in the same manner as described in connection with the previously described embodiment, i.e., by screws 83A, and as previously described, the disposition of the die segments 78A and 80A in blocks 81A and 82A give flexibility to the tonging head to permit it to accommodate various sizes of pipe depending upon the thickness of blocks used. Thus, for a relatively large pipe, relatively thin blocks are used as shown in FIGURE 3; and for a relatively small pipe, relatively thick blocks are used as shown in FIGURE 9.

In the embodiment disclosed in FIGURES 1-8, the outer partial ring 40 is contained for rotation about its axis by a plurality of rollers 46 mounted in the housing on shafts 47. Thus, the rollers bear against the outer ring as shown at 110 (see FIG. 4). In the embodiment disclosed in FIGURES 9-11 it will be noted that rollers 46A are mounted on shafts 47A which in turn are mounted within the outer partial ring 40A so that the rollers bear against the housing as at 111 rather than against the outer ring. In this embodiment, therefore, the rollers and their shafts move with the outer ring 40A as it rotates on its axis which has the additional advantage of maintaining uniform force relationship with the housing as the dies grip the pipe. For example, as the jaws are moved inwardly and outwardly by the relative rotation of the inner and outer rings respectively, in a manner previously described, the same relationship between the jaws, the camming surfaces, and the rollers 46A will be maintained throughout the entire operation so that the rollers 46A will support the gripping load, regardless of the size of the pipe being gripped in the same, in the same manner.

In this latter embodiment also rollers 112 supported in horizontally disposed shafts 113 are provided in the outer partial ring 40A to contain the outer partial ring and aid the bearing ring 51A in its support of the outer partial ring.

Wherein in the embodiment disclosed in FIGURES 9-11 like parts function the same as the parts described in connection with the embodiment disclosed in FIGURES 1-9, they were given the same reference numerals with the suffix A added thereto so that understanding of this latter embodiment is made clear without additional description thereof herein.

Too, while the rollers 46A an blocks 81A and 82A are shown together obviously they need not be used together and while the specific details of the invention have been herein shown and described, changes and alterations may be resorted to without departing from the spirit thereof as defined in the appended claims.

I claim:
1. A power tong for rotating a pipe comprising a frame having a throat for the reception of the pipe, a partial ring rotatively mounted on said frame and having a side opening therein which may be brought into alignment with said throat so that the pipe may be disposed within said ring, means for rotating said ring about its central axis, said ring being provided with cam surface means movable therewith, a plurality of means for bearing against a pipe disposed within said ring and for gripping the pipe solely therewithin, said plurality of means being movable into pipe bearing and gripping position by actuation of said cam surface means actuated by rotation of said ring, said movable means being pivotally connected to one another at a single pivot point, and means permitting relative adjustment at said pivot point of said last mentioned means to permit said last mentioned means to uniformly grip the pipe.

2. A power tong for rotating a pipe comprising a frame having a throat for the reception of the pipe, a partial ring rotatively mounted on said frame and having a side opening therein which may be brought into alignment with said throat so that the pipe may be disposed within said ring, means for rotating said ring about its central axis, said ring being provided with cam surface means movable therewith, a plurality of means for bearing against a pipe disposed within said ring and for gripping the pipe solely therewithin, said plurality of means being movable into pipe bearing and gripping position by actuation of said cam surface means actuated by rotation of said ring, said movable means being arranged so that upon rotation of said ring a portion of said last mentioned means adjacent said side opening moves more than the remainder of said last mentioned means, and means permitting relative adjustment of said last mentioned means to permit said last mentioned means to uniformly grip the pipe.

3. A power tong for rotating a pipe comprising a frame having a throat for the reception of the pipe, a partial ring rotatively mounted on said frame and having a side opening therein which may be brought into alignment with said throat so that the pipe may be disposed within said ring, means for rotating said ring about its central axis, said ring being provided with cam surface means movable therewith, a plurality of means for bearing against a pipe disposed within said ring and for gripping the pipe solely therewithin, said plurality of means being movable into pipe bearing and gripping postion by actuation of said cam surface means actuated by rotation of said ring, said movable means being arranged so that upon rotation of said ring a portion of said last mentioned means adjacent said side opening moves more than the remainder of said last mentioned means, and means located in the remainder of said last mentioned means permitting relative adjustment of said last mentioned means to permit said last mentioned means to uniformly grip the pipe.

4. A power tong for rotating a pipe comprising a frame having a throat for the reception of a pipe, a partial ring having rollers therein for rotatively mounting said partial ring in said frame and having a side opening therein which may be brought into alignment with said throat so that a pipe may be disposed within said ring, means for rotating said ring about its central axis, said ring being provided with cam surfaces disposed on opposite sides of the center line of said opening, jaw means including a pair of die means each disposed on opposite sides of said center line of said opening, rotation of said ring causing said cam surfaces to engage said jaw means to move said jaw means inwardly to grip said pipe on opposite sides thereof for sequential turning movement of said pipe, a pivot interconnecting said jaw means, and lost motion means responsive to initial contact with said pipe and including said pivot permitting said jaw means to adjust and to realign to grip said pipe so that each die imposes a force on the pipe.

5. A power tong for rotating a pipe comprising a frame having a throat for the reception of a pipe, a partial ring rotatably mounted on said frame and having a side opening therein which may be brought into alignment with said throat so that a pipe may be disposed within said ring, means for rotating said ring about its central axis, said ring being provided with cam surfaces disposed on opposite sides of the center line of said opening, jaw means including a pair of die means each disposed on opposite sides of said center line of said opening, rotation of said ring causing said cam surfaces to engage said jaw means to move said jaw means inwardly to grip said pipe on opposite sides thereof for sequential turning movement of said pipe, a pivot interconnecting said jaw means, and lost motion means responsive to initial contact with said pipe and including said pivot permitting said jaw means to adjust and to realign to grip said pipe so that each die imposes a force on the pipe.

References Cited by the Examiner
UNITED STATES PATENTS

| | | | |
|---|---|---|---|
| 1,300,995 | 4/19 | Moody | 81—57 |
| 2,128,244 | 8/38 | Green et al. | 81—91 |
| 2,181,641 | 11/39 | Hicks | 81—57 |
| 2,305,624 | 12/42 | Lange et al. | 81—57 |
| 2,650,070 | 8/53 | Lundeen | 81—53 X |
| 2,846,909 | 8/58 | Mason | 81—53 X |
| 2,879,680 | 3/59 | Beeman et al. | 81—53 X |
| 2,933,961 | 4/60 | Adams | 81—53 |
| 2,989,880 | 6/61 | Hesser et al. | 81—53 |
| 3,021,739 | 2/62 | Grundmann | 81—53 |
| 3,023,651 | 3/62 | Wallace | 81—57 |

WILLIAM FELDMAN, *Primary Examiner.*
SAMUEL B. ROTHBERG, MILTON S. MEHR,
*Examiners.*